Figure 1:
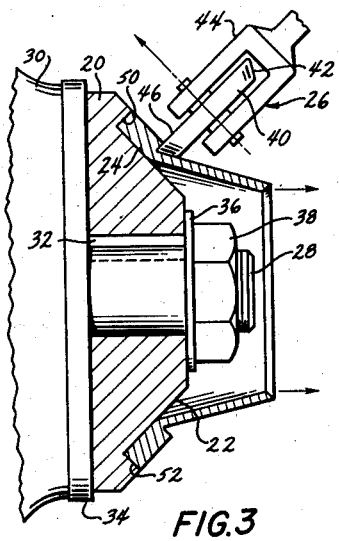

July 16, 1963 J. H. PETERS 3RD 3,097,620
METHOD OF MAKING HOLLOW ARTICLES
Filed Sept. 14, 1960 2 Sheets-Sheet 1

INVENTOR.
JOHN H. PETERS, 3RD.
BY
*Teller & McCormick*
ATTORNEYS

July 16, 1963  J. H. PETERS 3RD  3,097,620
METHOD OF MAKING HOLLOW ARTICLES
Filed Sept. 14, 1960  2 Sheets-Sheet 2

United States Patent Office 3,097,620
Patented July 16, 1963

3,097,620
METHOD OF MAKING HOLLOW ARTICLES
John H. Peters 3rd, Rockville, Conn., assignor to United Aircraft Corporation, East Hartford, Conn., a corporation of Delaware
Filed Sept. 14, 1960, Ser. No. 55,887
11 Claims. (Cl. 113—52)

This invention relates to a method of making hollow articles of varying circular cross section, and deals more particularly with a method wherein the metal of a starting blank is displaced by a forming tool moved in relative rotation to the blank and in such a manner as to effect a reduction in the wall thickness and an axial elongation of the blank material to produce the desired article.

The general object of this invention is to provide a simple method for working a metal blank to produce hollow articles having various longitudinally tapered shapes difficult to produce by other known methods. In keeping with this object, it is a more particular object to provide a method whereby the desired article in the usual case may be made by a single pass of the forming tool.

Another object of this invention is to provide a method of the character mentioned in the last paragraph and in which the metal of the starting blank is worked by being expressed or extruded between a mandrel and a forming tool thereby causing a flow deformation of the blank material which permits a more drastic change in shape than prior processes and which usually increases the strength of the blank material by changing the grain structure of the material.

A further object of this invention is to provide a method for shaping a mandrel-supported blank whereby various different longitudinal shapes and various wall thicknesses, varying or constant, may be imparted to the finished article by properly controlling the movement of a forming tool and the shape of the starting blank. In keeping with this object, a more particular object is to provide a method whereby the same mandrel may be employed to produce hollow articles of many different lengths, shapes and wall thicknesses.

Another object of this invention is to provide a method for shaping a blank by means of a mandrel and forming tool and in which method the mandrel may be much shorter and of a much more simple construction than the mandrels of prior processes, with resultant savings in mandrel weight, cost, handling and storage, in which method the mandrel need only be supported at one end, thereby facilitating the installation of the blank and the removal of the finished article, and in which method a much smaller machine may be used for supporting the tool and mandrel and for rotating the mandrel relative to the tool.

Another object of this invention is to provide a method of the above character which is applicable to many different materials.

Other objects and advantages of this invention will be apparent from the following description thereof and from the accompanying drawings.

In the drawings the method of the invention is shown as applied to a frusto-conical mandrel rotated relative to an angularly fixed forming tool, and various different shapes capable of being produced from such a mandrel are also shown, but it will be understood that various changes may be made from the mandrel shape shown, that the forming tool may be rotated rather than the mandrel, and that many shapes other than those shown may be made from the frusto-conical mandrel and from other mandrels. Therefore, the drawings should not be construed as defining or limiting the scope of the invention, the claims forming a part of this specification being relied upon for that purpose.

Figure 2:
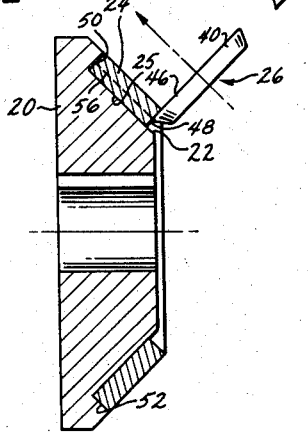
Figure 3:
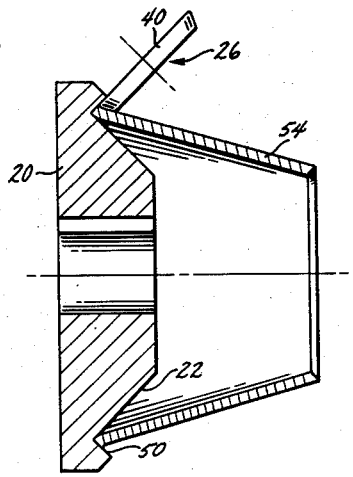
Figure 4:
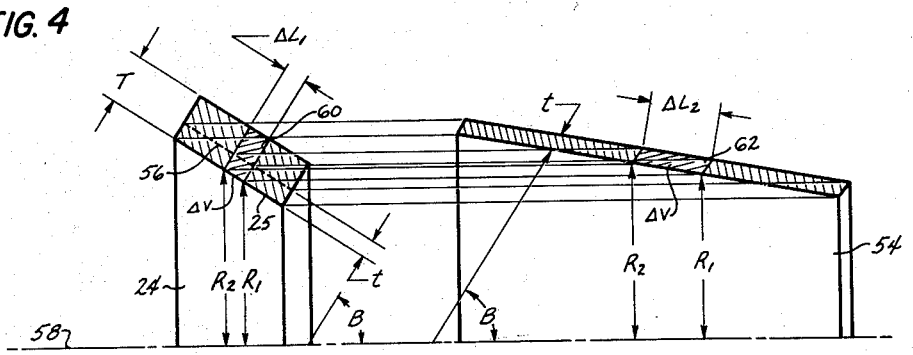

Of the drawings:

FIG. 1 is a generally longitudinal sectional view taken through a mandrel and blank and showing the blank being worked by a forming tool in accordance with the method of the present invention, the forming tool being shown in about the midpoint of the forming process and the structure of the machine for supporting and rotating the mandrel being shown in elevation, FIG. 2 is a longitudinal sectional view taken through a mandrel and blank and showing the relative positions of the tool and mandrel, and the shape of the starting blank, at the start of the forming process, FIG. 3 is a view similar to FIG. 2, but showing the condition existing at the end of the forming process, FIG. 4 is a diagrammatic representation of a starting blank and finished article illustrating the manner in which the material of the starting blank is deformed to produce the finished article, and FIGS. 5 to 10, inclusive, are diagrammatic representations exemplifying the various different article shapes which may be produced from the mandrel of FIG. 1, and showing the corresponding blank shapes used to obtain such article shapes.

In accordance with the general method of this invention an annular metal blank is placed on a mandrel having a longitudinally tapered working surface of circular cross section. The mandrel and blank are then rotated relative to a forming tool and the tool is pressed against the blank and moved in a generally axial or lengthwise direction toward the larger inner diameter end of the blank while the latter blank end is restrained against movement away from the tool. The blank is thus pinched between the tool and the mandrel, and the unworked portion thereof, located in advance of the tool, is placed in generally axial or lengthwise compression causing the same to flow or extrude between the tool and mandrel. This extrusion in turn effects a reduction in the wall thickness of the blank and a growth or elongation of the blank which occurs in an axial direction, the inside diameter of the extruded material being controlled by the diameter of the mandrel at the zone of the tool. Therefore, the material of the starting blank is not in general displaced radially but is rather flowed or displaced axially in a manner which preserves the diameters but changes the length of the starting blank to produce the desired article. The general method is characterized by the fact that due to the axial elongation of the blank material, occurring in a direction opposite to the direction of tool travel the material departs from the working surface of the mandrel behind the tool and takes on a shape different from that of the mandrel.

As mentioned, the mandrel provided for practicing the method of the invention has a longitudinally tapered working surface, and the articles produced by following the method also have a longitudinally tapered shape. As used here, and in the description and claims which follow, the term "tapered" is intended to designate any surface or shape having a large diameter at one end, a relatively smaller diameter at the other end, and a varying diameter between the large and small diameter ends which varying diameter does not at any point decrease in going from the small diameter end to the large diameter end. In other words, a "tapered" surface or shape, according to the present meaning, is one which is non-re-entrant or without neck-shaped portions.

Referring to FIGS. 1, 2 and 3, the method of the present invention is, by way of example, shown therein as practiced in conjunction with a mandrel 20 having a frusto-conical working surface 22. Although a frustoconical surface is preferred, due to its simplicity and the ease of producing such a surface, the working surface could, if desired, be provided instead with a concave, convex or compound curvature, and could even include a straight cylindrical portion. The important requirement in regard to the shape of the working surface is that it have no necked portions providing enlargements which would interfere with the rearward extrusion of the blank material, as will be hereinafter described. It will be understood that the mandrel, regardless of the shape of its working surface, should be symmetrical about its central axis, so as to have a circular cross section in any plane normal to the axis.

At the start of the process, an annular metal blank, having an inside surface conforming to the working surface of the mandrel, is placed on the mandrel with the said inner blank surface in engagement with the mandrel working surface. The metal blank should be a body of revolution so as to be symmetrical about its central axis and of circular cross section and may consist of a forging machined to provide the exact shape and dimensions required. One advantage of the present method, however, is that the surface finish of the blank is not extremely critical and may be rather rough since the extrusion or flow deformation occurring during the forming step will tend to remove or iron out normal surface irregularities such as result from machining.

FIG. 2 shows a starting blank 24 properly positioned on the mandrel 20, the blank 24 in this case having a uniform wall thickness along its length and a frustoconical interior surface 25 which conforms to and fully engages the mandrel working surface 22. However, except for the inside surface of the blank, which should conform closely to the mandrel working surface, the design and dimensions of the starting blank may be varied, as hereinafter described, to produce variations in the wall thickness, length and shape of the finished article. The mandrel 20 is therefore not limited to use with the particular blank shown but may also be used with many other differently shaped blanks having inside surfaces which match the working surface 22.

After the blank is properly placed on the mandrel, as shown in FIG. 2, the blank and mandrel are moved in rotation about their common axis of symmetry relative to a forming tool, indicated generally by the reference numeral 26 in FIGS. 1, 2 and 3. As shown in FIG. 1, the necessary relative rotation may be obtained by mounting the mandrel 20 on the shaft 28 of a suitable machine 30, the shaft 28 being driven in rotation by a power source in the machine through suitable drive mechanism. The mandrel 20 is angularly fixed on the shaft 28 as by a key 32 and axially clamped against a face plate 34 by a washer 36 and a nut 38 threadably engaged with the shaft 28. In the FIG. 1 arrangement the tool 26 is preferably supported by the bed or other structure (not shown) of the machine 30 and is fixed against rotation about the axis of the mandrel. Suitable mechanism, which may be of conventional construction and is not shown, is also provided for moving the tool axially and radially of the blank to produce a resultant tool movement lengthwise of the blank in the general direction of the arrow in FIG. 1, and preferably the tool movement is automatically controlled by a cam means or other motion control device.

The invention is, however, not limited to the particular mandrel rotating means shown in FIG. 1, and it is contemplated that if desired the mandrel and blank could be held stationary and the tool moved in rotation about their common axis to produce the necessary relative rotation. Also, various different types of tools may be used to form the blank. In FIG. 1 the tool 26 is shown to comprise a roller 40 having a coned peripheral surface 42 and carried by a bifurcated arm 44. Generally, it is preferred that the tool include some sort of roller element so as to reduce friction and decrease the driving power required, but this is not necessary.

The actual working of the blank material is now begun by applying the tool to the blank near or adjacent the smaller inner diameter end thereof and moving the tool lengthwise of the blank toward the larger inner diameter end while maintaining a spacing between the tool and the mandrel working surface which is less than the thickness of the blank. FIG. 2, for example, shows the relative positions of the blank, mandrel and tool at the start of a working pass of the tool. In this illustration the forward face 46 of the tool roller 40 is engaged with the end surface 48 of the blank. As the tool is moved forwardly or generally lengthwise of the blank in the direction of the arrow, the periphery of the tool roller 40 passes over the outer surface of the blank and is pressed against the outer surface so as to pinch the blank between the tool and the mandrel working surface. Thus, as the blank rotates relative to the tool the blank material will be reduced in thickness along its full circumference in the zone of the tool. If, as shown in FIG. 2, the tool is started in its lengthwise movement from the end surface 48, the resulting article will accordingly have a corresponding end portion of reduced thickness. In some instances, however, it may be desirable to provide a radial bead or flange at the smaller end of the article, and to accomplish this, the tool may be started at a position spaced forwardly from the end surface 48 so that the initial portion of the blank will be undeformed and left with its original shape and thickness.

As the tool is moved lengthwise of the blank and toward the larger inner diameter end thereof the latter blank end is restrained against movement in the same direction as the movement of the tool or in the direction generally away from the smaller inner diameter end thereof. Thus, as will be evident from FIGS. 1 and 2, the forward face 46 of the tool roller will engage a portion of the blank material and apply a generally lengthwise directed force thereto which, due to the restraint of the blank, serves to compress the unworked portion of the blank between the tool and the restrained end. As shown in FIG. 1, the restraint applied to the blank is preferably provided by a generally outwardly extending abutment surface or shoulder 50 located adjacent the large diameter end of the mandrel working surface 22, the blank 24 having an end surface 52 which conforms to and engages the surface 50 when the blank is properly positioned on the mandrel. Other means, however, may be employed for restraining the blank end without departing from the invention, and in some instances the necessary restraint may be supplied entirely by the wedging action occurring between the tapered working surface of the mandrel and the inner surface of the blank. Also, in most instances the frictional force developed between the mating surfaces of the blank and mandrel is sufficient to prevent rotation of the blank relative to the mandrel, but in other instances it may be desirable to provide more positive means for preventing such relative rotation. It is also generally desirable to apply a suitable lubricant to the blank and tool during the forming step.

The lengthwise compression of the blank material resulting from the forward movement of the working tool causes the material to be extruded or expressed between the tool and the mandrel working surface, the relative rotation of the tool and mandrel in effect generating an annular orifice for such extrusion. The material, as it passes between the tool and mandrel during this extrusion process, and due to the high pressure exerted thereon, is in a somewhat fluid state and, despite the fact that the original blank and the mandrel are tapered, tends to flow in an axial direction so as to have an inside diameter corresponding to the working surface diameter at the momentary zone of the tool. As the tool moves lengthwise, however, it cooperates with ever larger working surface diameters. Thus, the blank material is extruded with different diameters at different positions of the tool with the result that the extruded portion of the blank will have a longitudinally varying cross sectional shape. The extrusion of the blank material causes it to be reduced in wall thickness and to be elongated in an axial direction. The axial elongation causes the material to depart from the mandrel working surface behind the tool, as shown in FIG. 1, and to grow in length in a direction generally opposite to the movement of the tool, as indicated by the arrows in FIG. 1.

A finished article produced from the uniform thickness blank 24 of FIGS. 1 and 2 is shown at 54 in FIG. 3. The article 24 is of a uniform wall thickness and has a straight tapered shape. Its axial length is greater than the starting blank and the cone angle of the article is less than that of the blank. To produce this article the tool roller, during the working of the blank, is moved in a straight path, indicated by the broken line 56 in FIG. 2, parallel to the working surface of the mandrel so that the tool is maintained at a constant spaced relationship with the working surface. The blank material is therefore extruded at a constant thickness, resulting in the uniform wall thickness of the article 54, and with a constant percentage reduction in thickness. The rate of axial elongation (the amount by which the extruded portion grows in length per given amount of lengthwise movement of the tool) is dependent on the percentage reduction in wall thickness, and since the percentage reduction is constant the material is elongated at the same rate at all diameters of the mandrel to impart the straight tapered shape to the finished article. In other words, the blank material is elongated at a rate which is proportional to the rate of diameter increase (the amount by which the diameter is increased per given amount of lengthwise movement of the tool) and therefore the finished article will have a constant slope corresponding to a straight tapered shape.

The manner in which the blank is deformed to produce the finished article may be more readily appreciated by referring to FIG. 4 which shows the starting blank 24 at the left and the finished article 54 at the right. Assume that the starting blank has a uniform thickness T and that the tool in its movement along the path 56 is maintained at a uniform spacing $t$ with respect to the mandrel surface 22 and the inner surface 25 of the blank. The spacing $t$ is measured along a line normal to the surface 25 and at an angle B to the central axis indicated at 58, the angle B being the complement of the cone angle of the surface 25. As the tool moves an incremental distance $\Delta L_1$ along the length of the blank 24 it traverses an incremental annular segment, indicated at 60, having a volume $\Delta V$. Since the blank material is incompressible, this segment 60 must be deformed into a differently shaped segment 62 having the same incremental volume $\Delta V$. As the segment is deformed, however, its thickness is controlled by the spacing between the tool and the mandrel so that the deformed segment 62 will have imparted thereto the thickness $t$ as measured along a line at the angle B to the axis 58. Since the thickness of the material is decreased, the volume $\Delta V$ must therefore be preserved by an increase in length, and accordingly the length $\Delta L_1$ of the original segment 60 is increased to the length $\Delta L_2$ of the resulting segment 62.

Obviously, the amount by which the length of each incremental segment is increased will depend on the percentage reduction effected in the thickness of the blank. The greater the percentage reduction in thickness, the greater will be the growth in length. For example, if the spacing $t$ is equal to one-half the original thickness T, the percentage reduction will be approximately 50% and the length $\Delta L_2$ approximately twice the length $\Delta L_1$. If the spacing $t$ is equal to one-third the original thickness T, the percentage reduction will be approximately 67% and the length $\Delta L_2$ will be approximately three times the length $\Delta L_1$. These relations will not hold exactly, since the actual thickness of the resulting segment 62, as measured normal to its inner surface and used in calculating the percentage reduction, will be slightly less than the spacing $t$ due to a smaller cone angle for the segment 62 than for the segment 60.

Also, as the original segment 60 is deformed into the resulting segment 62 the resulting segment is provided with an inside diameter corresponding to the diameter of the mandrel working surface, and of the inner blank surface 25, at the zone of the tool. For example, assume that at a given instant the tool is positioned with its working zone in alignment with the right-hand end of the segment 60 where the diameter of the mandrel is equal to twice the radius $R_1$. The material flowing past the tool at that instant is accordingly provided with the same inside diameter as the mandrel at the zone of the tool so that the right-hand end of the resulting segment 62 will also have an inside surface diameter of twice $R_1$. As the tool is moved the distance $\Delta L_1$ the mandrel radius increases from $R_1$ to $R_2$ and the radius of the segment 62 accordingly increases from $R_1$ at its right-hand end to $R_2$ at its left-hand end. The forming process thus serves to deform the blank material in such a manner as to elongate the same axially while preserving the diameters of the blank. In other words, successive annular segments of the finished article will have mean inside diameters corresponding to the mean inside diameters of successive annular segments of the blank. Accordingly, the small end of the article will have the same inside diameter as the small end of the blank and the large end of the article the same inside diameter as the large end of the blank. It will also be obvious that since the length $\Delta L_1$ of the segment 60 represents the same change in diameter as does the greater length $\Delta L_2$ of the segment 62 that the segment 62 will have a more gradual slope, or smaller cone angle, than the segment 60.

From FIG. 4 it will be obvious that the wall thickness of the resulting article may be varied by varying the spacing $t$ between the tool and the mandrel. Thus, if the spacing $t$ is changed as the tool is moved lengthwise of the blank a corresponding change will be effected in the wall thickness of the resulting article. It will also be obvious that, by varying the percentage reduction in thickness as the tool is moved lengthwise, various longitudinally curved shapes may be imparted to the finished article. That is, varying the percentage reduction will vary the rate of axial growth and the shape of the finished article. Increasing the percentage reduction increases the rate of axial growth and results in a more gradual slope of the article, while a decrease in the percentage reduction decreases the rate of axial growth and results in a less gradual slope of the article. Thus, a gradual change in the percentage reduction as the tool is moved lengthwise will cause the blank material to be extruded at different rates at different diameters of the mandrel thereby providing the finished article with a changing slope to produce a longitudinally curved shape. Since the percentage reduction is a function of spacing $t$ and the blank thickness T, it may be varied by varying either the spacing $t$, as by moving the tool toward or away from the mandrel, or by varying the thickness T, as by providing the blank with a predetermined thickness variation.

Some of the different article shapes made possible by varying the tool spacing and/or the percentage reduction in the case of a frusto-conical mandrel are shown by FIGS. 5 to 10. In each of these figures the starting blank is shown at the left and the finished article at the right with the shaded portions indicating the shape of each in a longitudinal plane passing through the axis of symmetry. In each case the numeral 25 represents the inner frusto-conical surface of the blank which is placed in engagement with the conforming mandrel working surface, and the broken line indicated by the numeral 56 represents the path of the tool.

Figure 5:
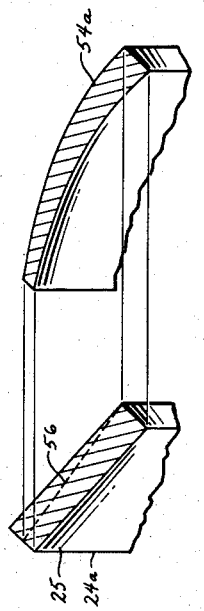

In FIG. 5 the blank $24_a$ is provided with a uniform wall thickness and is substantially similar to the blank 24 of FIGS. 2 and 4. Instead of maintaining a constant tool spacing, however, the tool is so controlled that the spacing varies from a maximum at the right-hand end of the blank $24_a$ to a minimum at the left-hand end thereof along the straight path 56. As a result, the thickness of the finished article $54_a$ varies from a maximum at its right-hand end to a minimum at its left-hand end. The article also has a convex curvature in longitudinal section. This curvature results from the fact that the percentage reduction is increased as the tool is moved lengthwise thereby causing the slope of the finished article to gradually decrease in going from its right-hand to its left-hand end.

Figure 6:
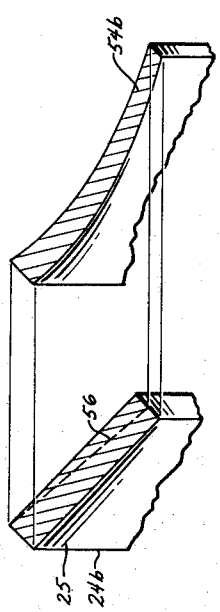

In FIG. 6 the blank $24_b$ is identical to the blank $24_a$ of FIG. 5 but the tool spacing is in effect reversed so that the spacing is at a minimum at the right-hand end of the blank and at a maximum at the left-hand end of the blank. Accordingly, the finished article $54_b$ will have a minimum thickness at its small or right-hand end and a maximum thickness at its large or left-hand end. Because of a varying percentage reduction effected by the forming tool the article $54_b$ will have a concave curvature in longitudinal section. That is, as the tool is moved from the right-hand to the left-hand end of the blank $24_b$ the percentage reduction is decreased so that the slope of the finished article increases from right to left.

Figure 7:
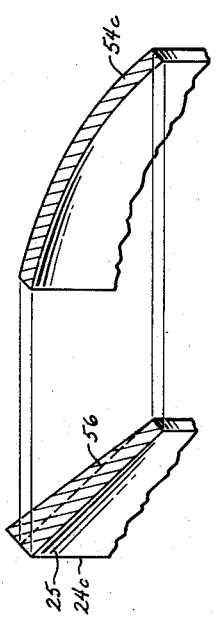

The blank $24_c$ in FIG. 7 is provided with a varying thickness by designing it with a conical outer surface having a larger cone angle than the inner surface 25, thus causing the thickness to increase in the direction of tool movement. The tool path 56 is parallel to the mandrel surface so that a constant tool spacing is maintained and a uniform wall thickness produced in the finished article $54_c$. Due to an increase in percentage reduction in the direction of tool movement, however, the finished article $54_c$ will have a convex curvature, as shown.

Figure 8:
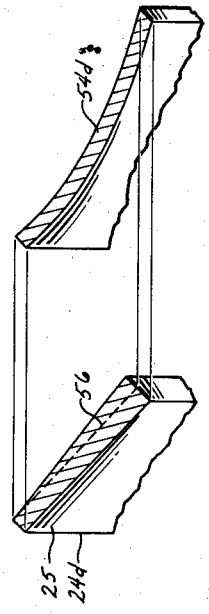

In FIG. 8 the blank $24_d$ is substantially similar to the blank $24_c$ in FIG. 7 except that the cone angle of its outer surface is less than the cone angle of the inner surface 25 whereby the blank thickness decreases at a constant rate in the direction of tool movement. The tool is again moved at a constant spacing to the mandrel surface so that a uniform wall thickness is produced in the resulting article $54_d$. Due to a decrease in percentage reduction in the direction of tool movement, however, the article $54_d$ is provided with a concave curvature, as shown.

Figure 9:
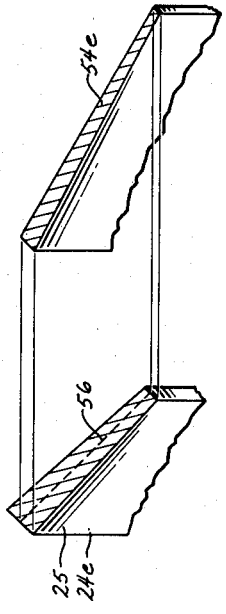

The blank $24_e$ shown in FIG. 9 is identical to the blank $24_c$ of FIG. 7. In FIG. 9, however, the tool is moved in such a manner that the tool path 56 is located midway between the inner and outer surfaces of the blank. This accordingly results in a constant percentage reduction in the wall thickness equaling approximately 50%. Due to this constant percentage reduction, the finished article $54_e$ will have a longitudinally straight tapered shape. Since the tool spacing is not constant, however, but instead increases in the direction of the tool movement, the article $54_e$ likewise has a nonuniform wall thickness which increases from a minimum at its right-hand end to a maximum at its left-hand end.

Figure 10:
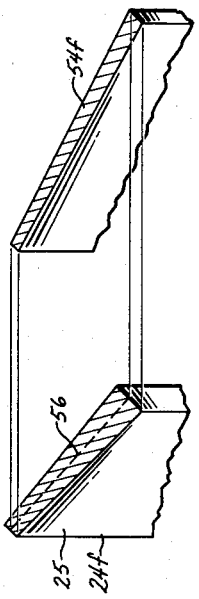

The blank $24_f$ of FIG. 10 is identical to the blank $24_e$ of FIG. 8. In FIG. 10, however, the tool is moved in a manner similar to that in FIG. 9 so that its path 56 is located midway between the inner and outer surfaces of the blank. Accordingly, there will be a constant percentage reduction resulting in a longitudinally straight tapered article $54_f$. Since in FIG. 10 the tool spacing decreases in the direction of the tool movement, the article $54_f$ has a nonuniform wall thickness which varies from a maximum at its right-hand end to a minimum at its left-hand end.

The article shapes of FIGS. 5 to 10 are, of course, only exemplary and many other different shapes could be obtained by using other blank shapes and other types of tool movement. Likewise, although all of the blanks of FIGS. 5 to 10 are shown adapted for use with a frusto-conical mandrel, it will be obvious that an infinite number of other article shapes may be obtained by using mandrels having contoured working surfaces instead of the frusto-conical surfaces shown. Since the shape and thickness of the finished article bear a definite relation to the mandrel shape, the tool path and the blank shape, it is a relatively simple matter to project a desired article shape into various different mandrel and blank shapes which may be used to produce the article.

The invention claimed is:

1. The method of forming a hollow metal article of varying circular cross section which method comprises the steps of, providing a mandrel having a tapered working surface of circular cross section, providing an annular metal blank having an inner surfacee conforming closely to said mandrel working surface, placing said blank on said mandrel with the inner surface thereof in engagement with said mandrel working surface, applying a forming tool to said blank in such relation to said mandrel as to pinch said blank between said forming tool and said mandrel working surface and simultaneously therewith imparting relative rotation between said forming tool and blank to effect a reduction in the thickness of said blank along the full circumference thereof at the zone of said tool, moving said forming tool in a direction generally lengthwise of said blank and toward the larger inner diameter end thereof while maintaining the forming tool in blank-pinching relationship with said mandrel, and restraining said larger inner diameter end of said blank against movement relative to said mandrel in the general direction of movement of said forming tool so that the unworked material of said blank is placed in compression by the generally lengthwise movement of said tool and is expressed in a generally axial direction between said forming tool and outer-mandrel surface with a consequent reduction in wall thickness and growth in length to produce the desired article.

2. The method of forming a hollow metal article of varying circular cross section which method comprises the steps of, providing a mandrel having a tapered working surface of circular cross section, providing an annular metal blank having an inner surface conforming closely to said mandrel working surface, placing said blank on said mandrel with the inner surface thereof in engagement with said mandrel working surface, restraining the larger inner diameter end of said blank against movement relative to said mandrel in the direction away from the smaller inner diameter end thereof, imparting relative rotation between said blank and a forming tool, axially moving said forming tool from the small diameter end of said mandrel toward the large diameter end thereof, and during said latter axial movement of said forming tool positioning said forming tool radially to maintain a spacing between said tool and said mandrel working surface which spacing is less than the unworked thickness of said blank at the zone of the tool whereby said blank is squeezed between said tool and mandrel and the unworked portion thereof placed in compression with the result that the material of the blank is extruded between said forming tool and mandrel with the material which passes at any instant between said forming tool and said mandrel moving in a generally axial direction relative to said mandrel and opposite to the movement of said forming tool so as to depart from that portion of said mandrel working surface located behind the zone of the tool and taking on an inside diameter substantially equal to that of said mandrel working surface at said tool zone.

3. The method of forming a hollow metal article of varying circular cross section which method comprises the steps of, providing a mandrel having a tapered working surface of circular cross section, providing an annular metal blank having an inner surface conforming closely to said mandrel working surface, placing said blank on said mandrel with the inner surface thereof in engagement with said mandrel working surface, restraining the larger inner diameter end of said blank against movement axially of said mandrel in the direction away from the smaller inner diameter end thereof, imparting relatives rotation between said blank and a forming tool, simultaneously pressing said forming tool against the outer surface of said blank and moving said forming tool generally lengthwise of said blank from the small diameter end of said mandrel toward the large diameter end thereof to cause the material of said blank to be reduced in thickness and axially elongated to produce the desired article by being extruded between said tool and mandrel, and during said latter generally lengthwise movement of said forming tool maintaining a constant spacing between said tool and said mandrel working surface so as to produce a constant wall thickness in the finished article.

4. The method of forming a hollow metal article of varying circular cross section which method comprises the steps of, providing a mandrel having a tapered working surface of circular cross section, providing an annular metal blank having an inner surface conforming closely to said mandrel working surface, placing said blank on said mandrel with the inner surface thereof in engagement with said mandrel working surface, restraining the larger inner diameter end of said blank against movement axially of said mandrel in the direction away from the smaller inner diameter end thereoef, imparting relative rotation between said blank and a forming tool, simultaneously pressing said forming tool against the outer surface of said blank and moving said forming tool generally lengthwise of said blank from the small diameter end of said mandrel toward the large diameter end thereof to cause the material to said blank to be reduced in thickness and axially elongated to produce the desired article by being extruded between said tool and mandrel, and during said latter generally lengthwise movement of said forming tool varying the spacing between said tool and said mandrel working surface in a predetermined manner to produce a related variation in the wall thickness of the finished article.

5. The method of forming a hollow metal article of varying circular cross section which method comprises the steps of, providing a mandrel having a tapered working surface of circular cross section, providing an annular metal blank having an inner surface conforming closely to said mandrel working surface, placing said blank on said mandrel with the inner surface thereof in engagement with said mandrel working surface, restraining the larger inner diameter end of said blank against movement axially of said mandrel in the direction away from the smaller inner diameter end thereof, imparting relative rotation between said blank and a forming tool, simultaneously pressing said forming tool against the outer surface of said blank and moving said forming tool generally lengthwise of said blank from the small diameter end of said mandrel toward the large diameter end thereof to cause the material of said blank to be reduced in thickness and axially elongated to produce the desired article by being extruded between said tool and mandrel, and during said latter lengthwise movement of said forming tool controlling the spacing between said tool and said mandrel working surface in such a manner as to effect a varying percentage reduction in the wall thickness of said blank and thereby a varying amount of axial blank elongation per given amount of lengthwise movement of said tool to impart a longitudinally curved shape to the finished article.

6. The method of forming a hollow metal article of varying circular cross section which method comprises the steps of, providing a mandrel having a tapered working surface of circular cross section, providing an annular metal blank having an inner surface conforming closely to said mandrel working surface and having a wall thickness which varies in a predetermined manner along the length thereof, placing said blank on said mandrel with the inner surface thereof in engagement with said mandrel working surface, restraining the larger inner diameter end of said blank against movement axially of said mandrel in the direction away from the smaller inner diameter end thereof, imparting relative rotation between said blank and a forming tool, simultaneously pressing said forming tool against the outer surface of said blank and moving said forming tool generally lengthwise of said blank from the small diameter end of said mandrel toward the large diameter end thereof to cause the material of said blank to be reduced in thickness and axially elongated to produce the desired article by being extruded between said tool and mandrel, and during said latter lengthwise movement of said forming tool maintaining a constant spacing between said tool and said mandrel working surface so as to produce a constant wall thickness in the finished article and so as to effect a varying percentage reduction in the wall thickness of the blank, due to the original thickness variation of the blank, and thereby a varying amount of axial blank elongation per given amount of lengthwise movement of said tool to impart a longitudinally curved shape to the finshed article.

7. The method of forming a longitudinally tapered hollow article of circular cross section which method comprises the steps of, providing a mandrel having a frusto-conical working surface and a generally outwardly extending abutment surface adjacent the larger diameter end of said working surface, placing on said mandrel an annular metal blank having a frusto-conical interior surface which confroms to and engages said mandrel working surface and an end surface which conforms to and engages said mandrel abutment surface, rotating said blank and mandrel relative to a forming tool, applying said tool to said blank and moving the same generally forwardly toward said abutment surface, and during said latter step maintaining a spacing between said tool and said mandrel working surface which spacing is less than the original wall thickness of the blank at the zone of the tool with the result that the material of the unworked portion of the blank is axially compressed between said tool and abutment surface and extruded axially rearwardly between said tool and mandrel so as to depart from said mandrel working surface with a consequent reduction in wall thickness and axial elongation to produce the desired article.

8. The method of forming a longitudinally tapered hollow article of circular cross section which method comprises the steps of, providing a mandrel having a frusto-conical working surface and a generally outwardly extending abutment surface adjacent the larger diameter end of said working surface, placing on said mandrel an annular metal blank having a frusto-conical interior surface which conforms to and engages said mandrel working surface and an end surface which conforms to and engages said mandrel abutment surface, rotating said blank and mandrel relative to a forming tool, pressing said tool against the outer surface of said blank so as to pinch said blank between said tool and said mandrel and at the same time moving said tool generally forwardly toward said abutment surface so that the material of the unworked portion of the blank is axially compressed between said tool and abutment surface and extruded axially rearwardly between said tool and mandrel with a consequent reduction in wall thickness and axial elongation to produce the desired article, and during said latter step varying the spacing between said tool and said mandrel working surface so as to vary the percentage reduction in the thickness of the blank and accordingly the amount of axial elongation produced for a given forward movement of said tool whereby said blank material is extruded at different rates and with different thickness at different diameters of said mandrel to impart a longitudinally curved shape and a varying wall thickness to the finished article.

9. The method of forming a longitudinally tapered hollow article of circular cross section and uniform wall thickness which method comprises the step of, providing a mandrel having a frusto-conical working surface and a generally outwardly extending abutment surface adjacent the larger diameter end of said working surface, placing on said mandrel an annular metal blank having a frusto-conical interior surface which conforms to and engages said mandrel working surface and an end surface which conforms to and engages said mandrel abutment surface, rotating said blank and mandrel relative to a forming tool, applying said tool to said blank and moving the same generally forwardly toward said abutment surface, and during said latter step maintaining a constant spacing between said tool and said mandrel working surface which constant spacing is less than the minimum wall thickness of the blank with the result that the material of the unworked portion of the blank is axially compressed between said tool and abutment surface and extruded at a constant wall thickness axially rearwardly between said tool and mandrel so as to axially elongate and depart from said mandrel working surface to produce the desired article.

10. The method of forming a longitudinally tapered hollow article of circular cross section which method comprises the steps of, providing a mandrel having a frusto-conical working surface and a generally outwardly extending abutment surface adjacent the larger diameter end of said working surface, placing on said mandrel an annular metal blank having a varying wall thickness and having a frusto-conical interior surface which conforms to and engages said mandrel working surface and an end surface which conforms to and engages said mandrel abutment surface, rotating said blank and mandrel relative to a forming tool, pressing said tool against the outer surface of said blank and at the same time moving said tool generally forwardly toward said abutment surface so that the material of the unworked portion of said blank is axially compressed between said tool and abutment surface and extruded axially rearwardly between said tool and mandrel with a consequent reduction in wall thickness and axial elongation to produce the desired article, and during said latter step maintaining a constant spacing between said tool and said mandrel working surface so that the material of said blank is extruded at a constant wall thickness and so that a variation occurs in the percentage of wall thickness reduction, due to the initial variation in the thickness of the blank, whereby the blank material is extruded at different rates at different diameters of the mandrel to impart a longitudinally curved shape to the finished article.

11. The method of forming a longitudinally straight tapered hollow article of circular cross section which method comprises the steps of, providing a mandrel having a frusto-conical working surface and a generally outwardly extending abutment surface adjacent the larger diameter end of said working surface, placing on said mandrel an annular metal blank having a frusto-conical interior surface which conforms to and engages said mandrel working surface and an end surface which conforms to and engages said mandrel abutment surface, rotating said blank and mandrel relative to a forming tool, pressing said tool against the outer surface of said blank and at the same time moving said tool generally forwardly toward said abutment surface so that the material of the unworked portion of said blank is axially compressed between said tool and abutment surface and extruded axially rearwardly between said tool and mandrel with a consequent reduction in wall thickness and axial elongation to produce the desired article, and during said latter step controlling the spacing between said tool and said mandrel working surface in such a manner as to effect a constant percentage reduction in the wall thickness of the blank whereby the blank material is extruded at the same rate at all diameters of the mandrel to impart a longitudinally straight tapered shape to the finished article.

References Cited in the file of this patent

UNITED STATES PATENTS

| | | |
|---|---|---|
| Re. 19,790 | Lindgren | Dec. 17, 1935 |
| 2,522,257 | Curtis | Sept. 12, 1950 |
| 2,610,304 | Garner et al. | Sept. 9, 1952 |
| 2,932,890 | Sporch et al. | Apr. 19, 1960 |

OTHER REFERENCES

Journal of the Mechanics of Physics of Solids, ed.-in-chief R. Hill, Dept. of Math., the University, Nottingham, England, pp. 193–201.